(12) United States Patent
Vacar et al.

(10) Patent No.: US 7,890,278 B2
(45) Date of Patent: Feb. 15, 2011

(54) CHARACTERIZING THE RESPONSE OF A DEVICE IN A COMPUTER SYSTEM TO VIBRATION OVER A FREQUENCY RANGE

(75) Inventors: Dan Vacar, San Diego, CA (US); Anton A. Bougaev, La Jolla, CA (US); David K. McElfresh, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 123 days.

(21) Appl. No.: 12/220,815

(22) Filed: Jul. 28, 2008

(65) Prior Publication Data

US 2010/0023280 A1   Jan. 28, 2010

(51) Int. Cl.
*G06F 19/00* (2006.01)

(52) U.S. Cl. ............... 702/56; 702/33; 702/34; 714/42; 714/47; 714/48; 73/1.82; 73/570; 73/862.41; 73/862.59

(58) Field of Classification Search ............ 702/33, 702/34, 56; 714/42, 47, 48; 73/1.82, 570, 73/862.41, 862.59
See application file for complete search history.

(56) References Cited

U.S. PATENT DOCUMENTS

2002/0038188 A1 * 3/2002 Fioravanti .............. 702/75

\* cited by examiner

*Primary Examiner*—Sujoy K Kundu
(74) *Attorney, Agent, or Firm*—Park, Vaughan, Fleming & Dowler LLP

(57) ABSTRACT

Some embodiments of the present invention provide a system that characterizes a response of a device in a computer system to vibration over a frequency range. During operation, the device is vibrated at each frequency in a set of frequencies in the frequency range, wherein the device is vibrated at each frequency, one frequency at a time, until a stabilized response of the device is determined. The response of the device to vibration over the frequency range is then characterized based on information related to the stabilized response at each frequency in the set of frequencies.

21 Claims, 5 Drawing Sheets
(2 of 5 Drawing Sheet(s) Filed in Color)

CHARACTERIZING THE RESPONSE OF A DEVICE IN A COMPUTER SYSTEM TO VIBRATION OVER A FREQUENCY RANGE

BACKGROUND

1. Field

The present invention generally relates to techniques for characterizing the performance of a device or a component in a computer system, such as a disk drive. More specifically, the present invention relates to a method and an apparatus that characterizes the response of a device or a component in a computer system to vibration over a frequency range.

2. Related Art

Typically, during vibration testing, a device under test is monitored while the vibration frequency is swept over the frequency range of interest at a constant sweep rate with a constant dwell time at each frequency. However, if the response of the device at frequencies in the frequency range takes varying amounts of time to reach steady state, then a frequency sweep rate that is set too high may underestimate or otherwise mischaracterize the response of the device at frequencies in the frequency range. In order to accurately characterize the steady-state response of the device, the frequency sweep rate may have to be set to be at least as slow as the slowest steady-state response. This can increase the time required to vibration test a device, lowering the testing throughput and potentially increasing the cost of the testing.

Hence, what is needed is a method and system that characterizes a response of a device to vibration over a frequency range without the above-described problems.

SUMMARY

Some embodiments of the present invention provide a system that characterizes a response of a device in a computer system to vibration over a frequency range. During operation, the device is vibrated at each frequency in a set of frequencies in the frequency range, wherein the device is vibrated at each frequency, one frequency at a time, until a stabilized response of the device is determined. The response of the device to vibration over the frequency range is then characterized based on information related to the stabilized response at each frequency in the set of frequencies.

In some embodiments, determining the stabilized response of the device includes determining the stabilized response of the device based on the response of the device when the response of the device changes by less than a predetermined amount for a predetermined period of time.

In some embodiments, determining the stabilized response of the device includes determining the stabilized response based on a relationship between the response of the device and a predetermined response profile.

In some embodiments, characterizing the response of the device to vibration over the frequency range includes determining a time constant for the response of the device at frequencies in the set of frequencies.

In some embodiments, characterizing the response includes characterizing the response for a dwell time at frequencies in the set of frequencies.

In some embodiments, characterizing the response includes characterizing the response based a difference between a predetermined response and the stabilized response.

In some embodiments, characterizing the response includes characterizing the response based on an elapsed time between when the device begins vibrating at a frequency in the set of frequencies and when the response stabilizes.

In some embodiments, the device includes a disk drive, and the response includes at least one of: a read rate, and a write rate.

In some embodiments, the frequency range includes a minimum frequency of approximately 20 Hz, and a maximum frequency of approximately 2,000 Hz.

In some embodiments, frequencies in the set of frequencies are separated by at least 1 Hz.

COLOR DRAWINGS

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
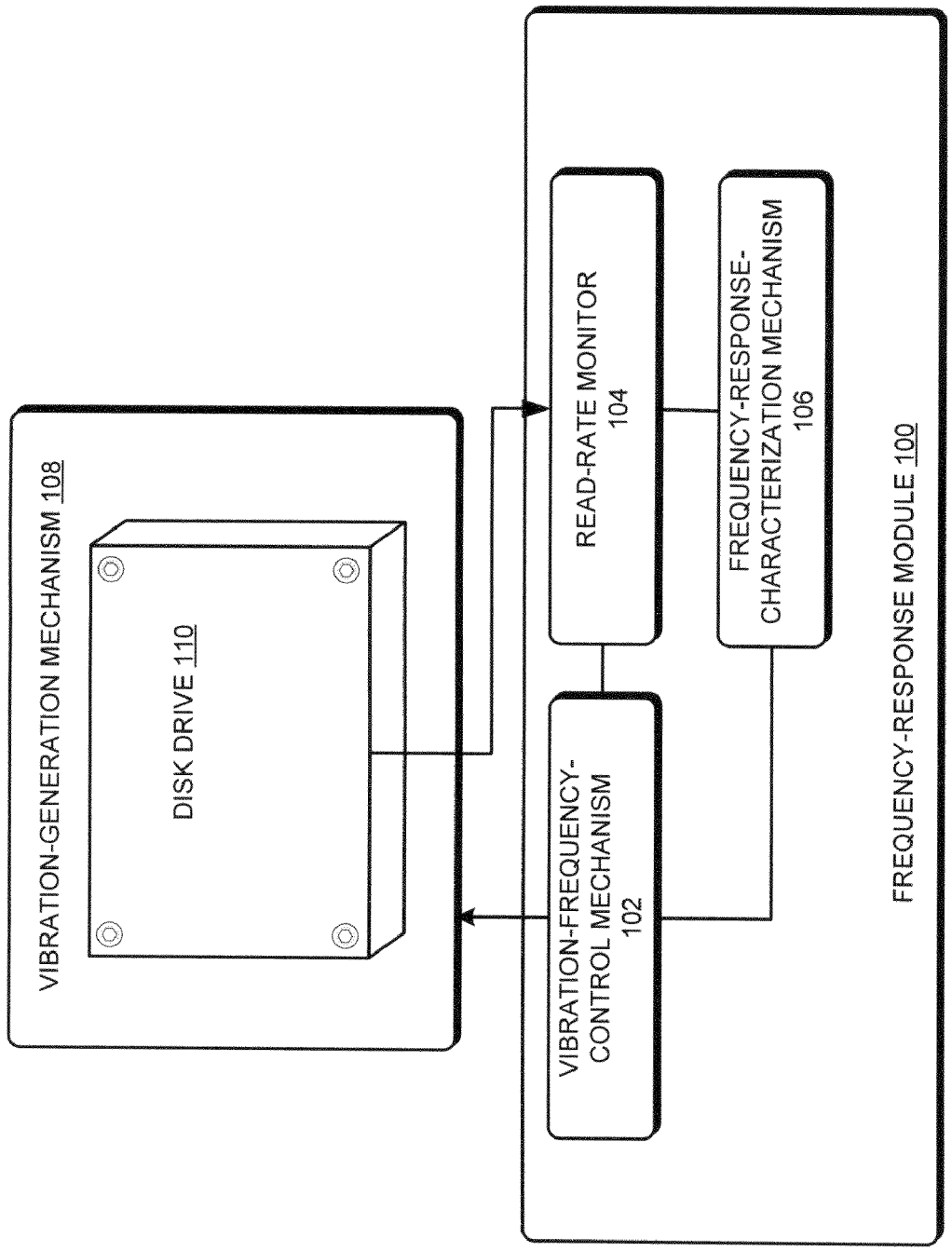
FIG. 1 depicts a system for characterizing a response of a disk drive to vibration over a frequency range in accordance with some embodiments of the present invention.

FIG. 1 depicts a system for characterizing a response of a device to vibration over a frequency range in accordance with some embodiments of the present invention. Frequency-response module 100 includes vibration-frequency-control mechanism 102, read-rate monitor 104, and frequency-response-characterization mechanism 106. Vibration-generation mechanism 108 is coupled to disk drive 110 so that vibrations generated by vibration-generation mechanism 108 are transferred to disk drive 110. Vibration-frequency-control mechanism 102 is coupled to read-rate monitor 104, frequency-response-characterization mechanism 106, and vibration-generation mechanism 108, and read-rate monitor 104 is also coupled to frequency-response-characterization mechanism 106 and disk drive 110.

Vibration-frequency-control mechanism 102 controls the vibration frequency of vibration-generation mechanism 108. Note that vibration-frequency-control mechanism 102 can be implemented in any combination of hardware and software. In some embodiments, vibration-frequency-control mechanism 102 is implemented in hardware or a combination of hardware and software in vibration-generation mechanism 108.

Read-rate monitor 104 monitors the read rate of disk drive 110. Read-rate monitor 104 can be implemented in any combination of hardware and software. In some embodiments, read-rate monitor 104 is implemented in hardware or a combination of hardware and software in vibration-generation mechanism 108. In some embodiments read-rate monitor 104 and vibration-frequency-control mechanism 102 are implemented in the same hardware or combination of hardware and software outside of frequency response module 100.

Frequency-response-characterization mechanism 106 is coupled to read rate monitor 104 and vibration frequency control mechanism 102. Frequency-response-characterization mechanism 106 can be implemented in any combination of hardware and software. In some embodiments, frequency-response-characterization mechanism 106 is implemented in hardware or a combination of hardware and software in vibration-generation mechanism 108. In some embodiments, frequency-response-characterization mechanism 106, read-rate monitor 104, and vibration-frequency-control mechanism 102 are implemented in the same hardware or combination of hardware and software.

Vibration-generation mechanism 108 is any mechanism that can generate vibration at a predetermined frequency and cause a device under test such as disk drive 110 to vibrate at the predetermined frequency. In some embodiments vibration-generation mechanism is a vibration test system. Disk drive 110 can be any disk drive that it is desired to have a read rate characterized as a function of frequency over a frequency range. In some embodiments, disk drive 110 is a hard disk drive.

Some embodiments of the system depicted in FIG. 1 operate as follows. Vibration-frequency control mechanism 102 is configured to control vibration-generation mechanism 108 to vibrate at a set of frequencies in a frequency range from a minimum frequency to a maximum frequency. In some embodiments, frequencies in the set of frequencies are evenly spaced in the frequency range, while in other embodiments frequencies in the set of frequencies are not evenly spaced and may be spaced based on known or predetermined characteristics of disk drive 110 or specific frequencies that it is desired to test. In some embodiments, the frequency range is from 2 Hz to 2 kHz, and frequencies in the set of frequencies range from 20 Hz to 2 kHz in 1 Hz increments.

Vibration-frequency-control mechanism 102 controls vibration-generation mechanism 108 to vibrate at a frequency, f, in the frequency set. Vibration-generation mechanism 108 vibrates at frequency f causing disk drive 110 to vibrate at frequency f. While disk drive 110 vibrates at frequency f, read-rate monitor 104 monitors the read rate of disk drive 110, at frequency f at time t, RR(f;t). Read-rate monitor 104 sends the monitored read rate, RR(f;t), to frequency-response-characterization mechanism 106. In some embodiments, vibration-frequency-control mechanism 102 continues to control vibration-generation mechanism 108 to vibrate at frequency f until frequency-response-characterization mechanism 106 determines a stabilized read rate for disk drive 110.

In some embodiments, a stabilized read rate for disk drive 110 is determined as follows. The read rate for disk drive 110 is measured at regular intervals. In some embodiments, the regular intervals can include but are not limited to once every: 0.5 second, and 1 second. In some embodiments the read rate is considered to be stabilized when the read rate of disk drive 110 varies by less than a predetermined amount for a predetermined time period. In some embodiments, the read rate for disk drive 110 is considered to be stabilized when the read rate changes by less than a predetermined amount for each of 5 consecutive read-rate measurements wherein each measurement is separated by a predetermined amount such as 1 second. When frequency-response-characterization mechanism 106 determines that the read rate for disk drive 110 has stabilized, frequency-characterization mechanism 106 determines a stabilized read rate at frequency f, $RR_\infty(f)$, for disk drive 110 based on the last read rate of disk drive 110 by read rate monitor 104 at frequency f, $RR_\infty(f)=RR(f;t)$. Frequency-response-characterization mechanism 106 also determines the settling time, $\tau(f)$, between when disk drive 110 started vibrating at frequency f and when the read rate at frequency f stabilized. Frequency-response-characterization mechanism 106 then commands vibration-frequency control mechanism 102 to change the vibration frequency of vibration-generation mechanism 108 to the next frequency in the set of frequencies in the frequency range. The above cycle continues until $RR_\infty(f)$, and $\tau(f)$ have been determined for all frequencies in the set of frequencies in the frequency range.

In some embodiments, a stabilized read rate for disk drive 110 is determined by fitting the measured read rate data to a read rate response profile. In some embodiments, the response profile is selected based on the measured or presumed behavior of the read rate as disk drive 110 is vibrated. In some embodiments, the response profile is represented by equation 1, in which RR(f;t) is the read rate at frequency f at time t, $RR_\infty(f)$ is the stabilized read rate at frequency f, $RR_0$ is the read rate before disk drive 110 is vibrated, and T(f) is a time constant. In some embodiments, the read rate for disk drive 110 is measured at regular intervals and the measured read rates are fit to equation 1. When enough read rate measurements have been taken at vibration frequency f to fit to equation 1 within a predetermined error, then the stabilized read rate and time constant are determined. In some embodiments, the stabilized read rate and time constant are used with equation 1 to determine an elapsed time between when disk drive 110 begins vibrating at frequency f and when the read rate would stabilize. In some embodiments, the read rate is considered to be stabilized when it is within a predetermined amount of $RR_\infty(f)$.

$$RR(f;t) = RR_\infty(f) + [RR_0 - RR_\infty(f)]e^{-\frac{t}{T(f)}} \quad (1)$$

Frequency-response-characterization mechanism 106 then commands vibration-frequency-control mechanism 102 to change the vibration frequency of vibration-generation mechanism 108 to the next frequency in the set of frequencies in the frequency range. The above cycle continues until $RR_\infty$ (f), and T(f) have been determined for all frequencies in the set of frequencies in the frequency range.

In some embodiments, read rate monitor 104 is replaced by a monitor that monitors another parameter of disk drive 110, including but not limited to the write rate, or another other parameter of disk drive 110. In some embodiments, disk drive 110 is replaced by another device with a parameter to be characterized as a function of frequency over a frequency range, and read-rate monitor 104 is replaced by a monitor that monitors the parameter of interest.

Figure 2:
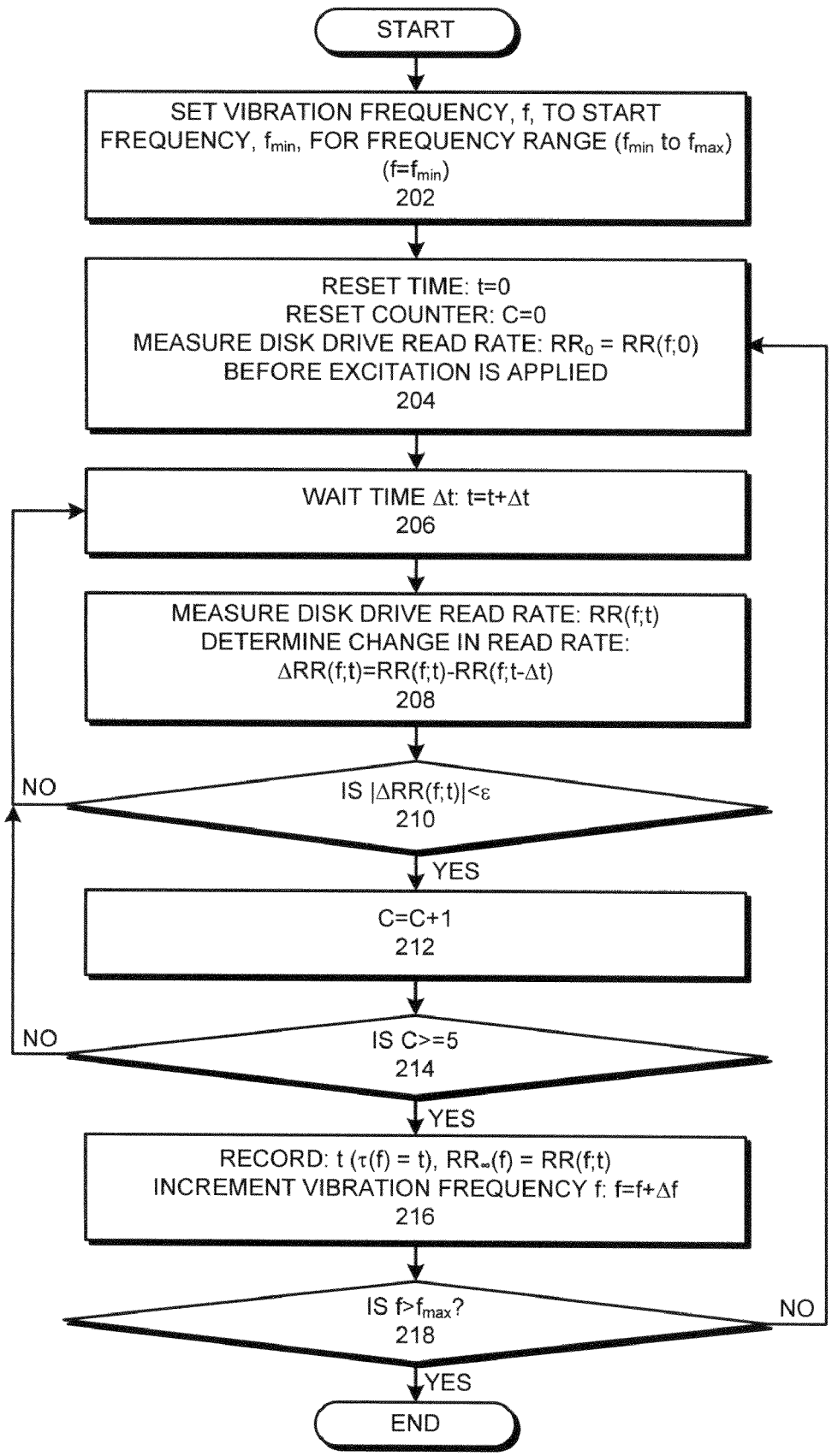
FIG. 2 presents a flowchart illustrating a process for characterizing a response of a device to vibration over a frequency range in accordance with some embodiments of the present invention.

FIG. 2 presents a flowchart illustrating a process for characterizing a read rate of a disk drive as the disk drive is subjected to vibration over a frequency range from $f_{min}$ to $f_{max}$ in accordance with some embodiments of the present invention. First, the vibration frequency, f, is set to the start frequency for the frequency range of interest (step 202). The elapsed time counter, t, is reset to t=0, the loop counter C is reset to C=0, and the read rate at frequency f and time t=0, $RR_0=RR(f;0)$ is measured for the disk drive being characterized before any excitation is applied to the disk drive (step 204). Then the process waits a predetermined time $\Delta t$ (step 206). Next, the read rate is measured, RR(f;t) and a change in the read rate from the previous read rate measurement is calculated: $\Delta RR(f;t)=RR(f;t)-RR(f;t-\Delta t)$ (step 208). Then, if the absolute value of the change in the read rate is not less than a predetermined amount, $\epsilon$, (step 210) the process returns to step 206. If the absolute value of the change in the read rate is less than the predetermined amount, $\epsilon$, (step 210) then the process continues to step 212. The loop counter, C, is then increased by 1 (step 212). If the loop counter is not greater than or equal to 5 (step 214) then the process returns to step 206. If the loop counter, C, is greater than or equal to 5 (step 214) then the process continues to step 216. In some embodiments, a loop counter threadhold larger or smaller than 5 can be used.

The settling time, $\tau(f)$, between when the disk drive started vibrating at frequency f and when the read rate stabilized, as indicated by 5 consecutive samples of the read rate changing by less than a predetermined amount, $\epsilon$, is set equal to the elapsed time, t (step 216). Also, the read rate at time $\tau(f)$ and frequency f, $RR(f; \tau(f))$ is recorded (step 216). The vibration frequency is then increased by a predetermined amount $\Delta f$ (step 216). In some embodiments, the predetermined frequency increment is 1 Hz. If the frequency, f, is not greater than the maximum frequency for the frequency range, $f_{max}$, (step 218), then the process returns to step 204. If the frequency, f, is greater than the maximum frequency for the frequency range, $f_{max}$, (step 218), then the process ends.

Figure 3:
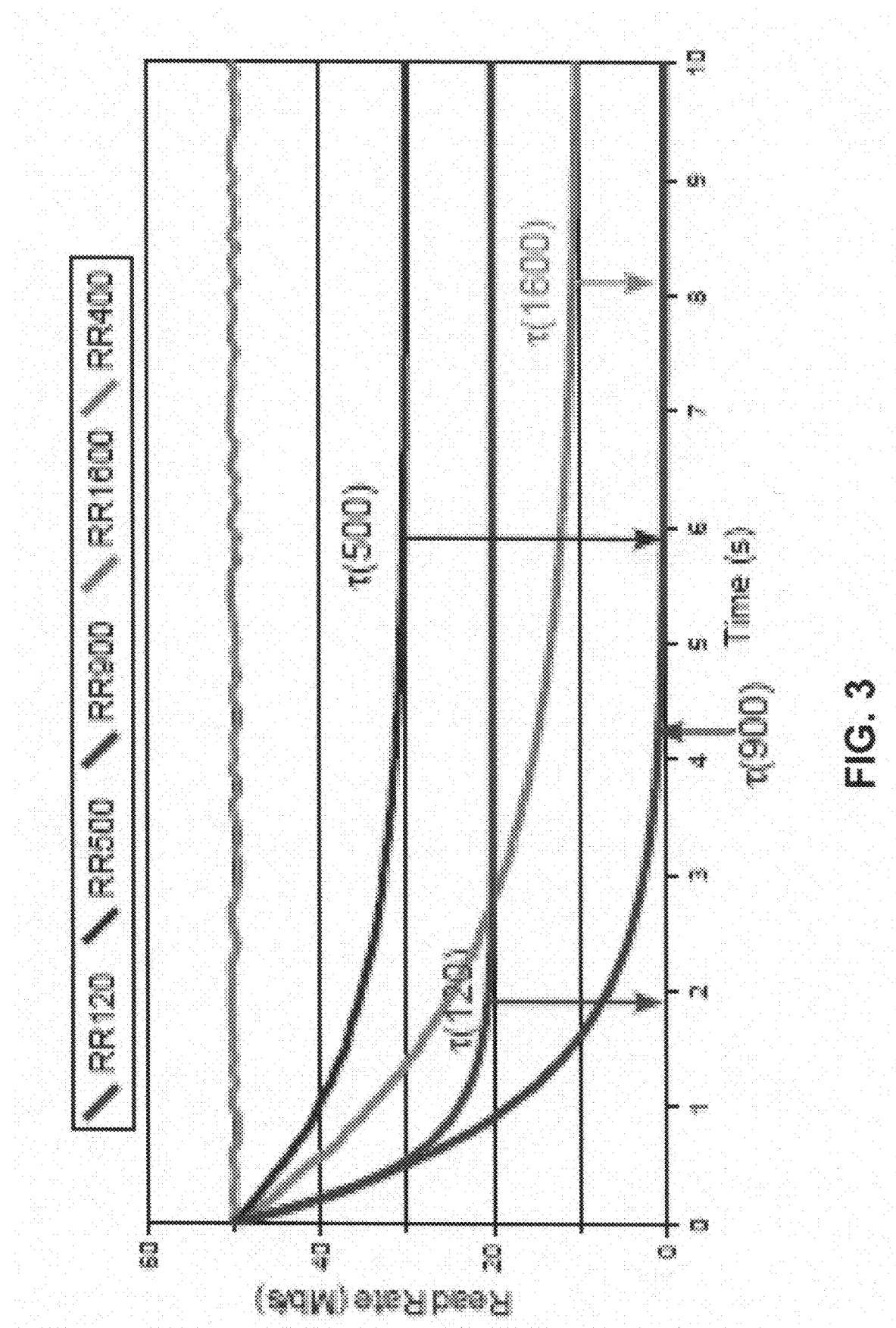
FIG. 3 presents a graph illustrating a curve fit of the read rate for a disk drive measured in accordance with some embodiments of the present invention.

FIG. 3 presents a graph illustrating a curve fit of the read rate for a disk drive measured in accordance with some embodiments of the present invention. In FIG. 3, the read rate of a disk drive is characterized by curve fitting data measured in accordance with some embodiments of the present invention to equation 1 to determine a time constant T(f) for 5 frequencies: 120 Hz, 400 Hz, 500 Hz, 900 Hz, and 1600 Hz.

Figure 4:
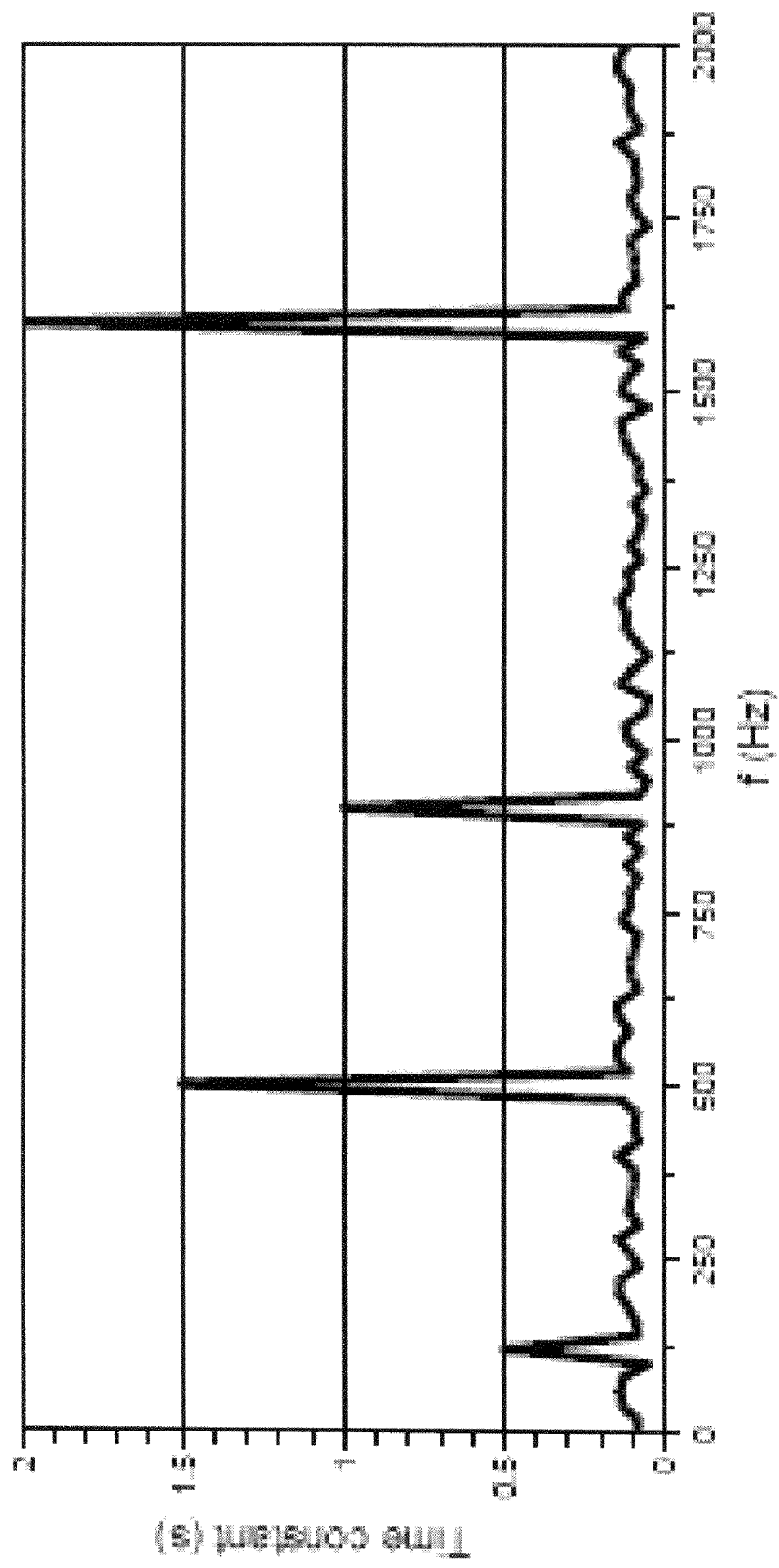
FIG. 4 presents a graph of the time constant T(f) vs. frequency, f, for the read rate for a disk drive measured in accordance with some embodiments of the present invention.

FIG. 4 presents a graph of the time constant T(f) vs. frequency, f, for data measured in accordance with some embodiments of the present invention and curve fit to equation 1 above.

Figure 5:
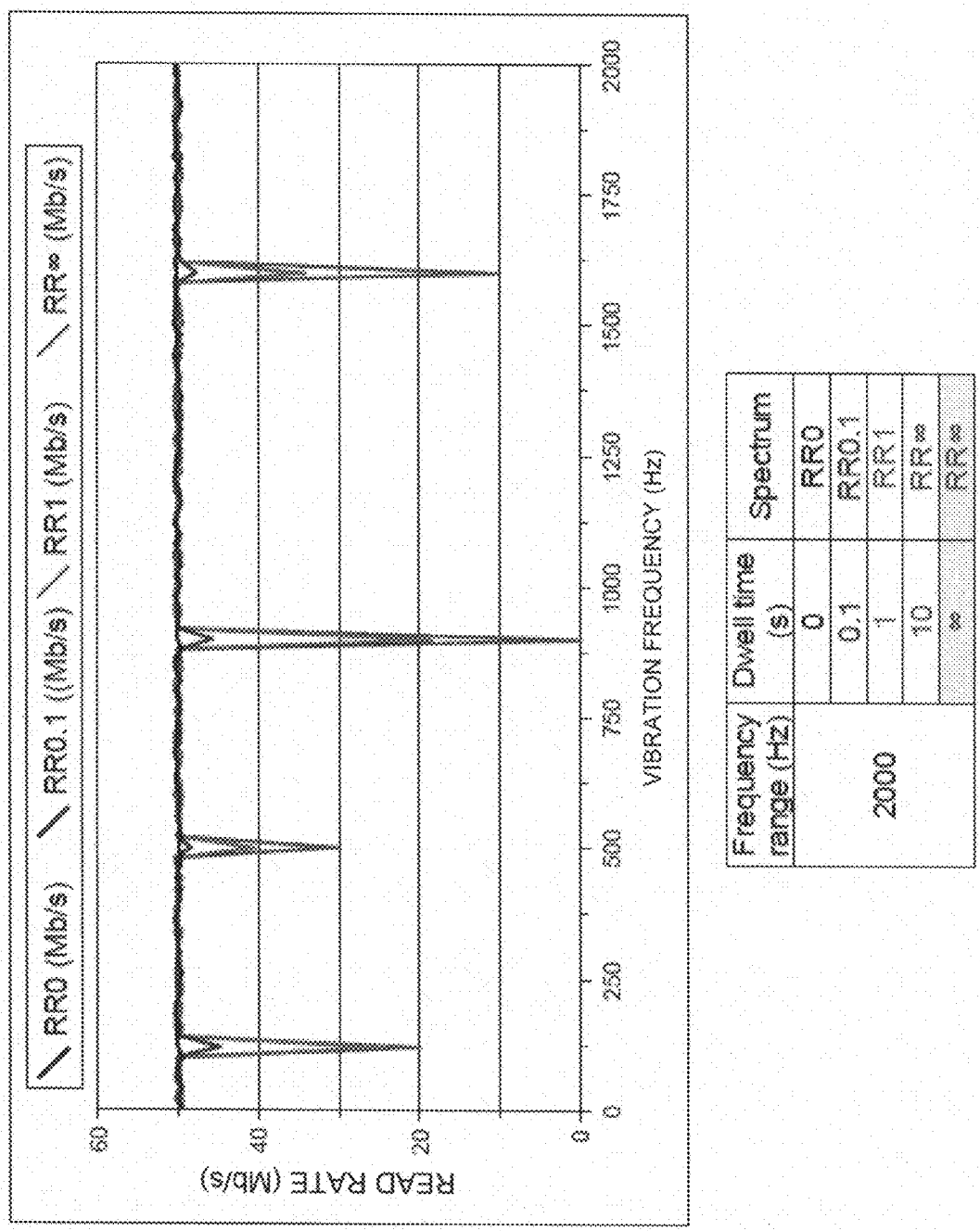
FIG. 5 presents a graph of a disk drive read rate, RR, vs. frequency, f, for various dwell times measured in accordance with some embodiments of the present invention.

FIG. 5 presents a graph of a disk drive read rate, RR, vs. frequency, f, for various dwell times measured in accordance with some embodiments of the present invention. As depicted in FIG. 5, the read rate at a dwell time of zero seconds for each vibration frequency tested in the frequency range shows no substantial deviation across the frequency range. At a dwell time of 0.1 seconds, a deviation in the read rate from the zero second dwell time read rate appears, but results in less than a 10 Mb/s reduction in the read rate in the frequency range. Note that at a dwell time of 0.1 seconds, the read rate at a vibration frequency about 120 Hz exhibits the largest decrease. At a dwell time of 1 second, the read rate at shows a noticeable reduction at 4 frequencies in the frequency range and has been reduced by more than one-half at the vibration frequencies of about 120 Hz and about 900 Hz. Note that the reduction in read rate at a dwell time of 0.1 seconds is larger at about 120 Hz than at about 900 Hz, but at a dwell time of 1 second, the read rate reduction is larger at about 900 Hz than at about 120 Hz.

When the dwell time changes from 1 second to 10 seconds, the read rate at about 120 Hz is reduced by less than the read rate at the 3 other frequencies that exhibit a substantial read rate reduction. Note that at a dwell time of 10 seconds, the read rate reduction at about 1600 Hz is larger than the read rate reduction at about 120 Hz. As depicted in FIG. 5, for the 4 frequencies exhibiting read rate reductions, the magnitude of the read rate reduction depends on the dwell time at the frequency of interest. Additionally, the relative read rate reduction at the 4 frequencies changes as the dwell time changes. For example, a vibration test with a 0.1 second dwell time that measures the read rate of the disk drive measured in FIG. 5 may result in a determination that the read rate is most strongly reduced by vibrations at about 120 Hz and that the maximum read rate reduction is less than 10 Mb/s. However, when the disk drive is operating in a computer system and exposed to vibrations for a dwell time longer than 0.1 seconds, the read rate may be reduced by more than 10 Mb/s and the maximum read rate reduction may occur at a frequency other than about 120 Hz. Note that the read rate at a dwell time of 10 seconds is about the same as the stabilized read rate.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for characterizing a response of a device in a computer system to vibration over a frequency range, the method comprising:

vibrating the device at each frequency in a set of frequencies in the frequency range, wherein the device is vibrated at each frequency, one frequency at a time, until a stabilized response of the device is determined; and characterizing the response of the device to vibration over the frequency range based on information related to the stabilized response at each frequency in the set of frequencies.

2. The method of claim 1, wherein:

determining the stabilized response of the device includes determining the stabilized response of the device based on the response of the device when the response of the device changes by less than a predetermined amount for a predetermined period of time.

3. The method of claim 1, wherein:

determining the stabilized response of the device includes determining the stabilized response based on a relationship between the response of the device and a predetermined response profile.

4. The method of claim 1, wherein:
characterizing the response of the device to vibration over the frequency range includes determining a time constant for the response of the device at frequencies in the set of frequencies.

5. The method of claim 1, wherein:
characterizing the response includes characterizing the response for a dwell time at frequencies in the set of frequencies.

6. The method of claim 1, wherein:
characterizing the response includes characterizing the response based a difference between a predetermined response and the stabilized response.

7. The method of claim 1, wherein:
characterizing the response includes characterizing the response based on an elapsed time between when the device begins vibrating at a frequency in the set of frequencies and when the response stabilizes.

8. The method of claim 1, wherein:
the device includes a disk drive; and
the response includes at least one of:
 a read rate; and
 a write rate.

9. A non-transitory computer-readable storage medium storing instructions that when executed by a computer cause the computer to perform a method for characterizing a response of a device in a computer system to vibration over a frequency range, the method comprising:
vibrating the device at each frequency in a set of frequencies in the frequency range, wherein the device is vibrated at each frequency, one frequency at a time, until a stabilized response of the device is determined; and
characterizing the response of the device to vibration over the frequency range based on information related to the stabilized response at each frequency in the set of frequencies.

10. The computer-readable storage medium of claim 9, wherein:
determining the stabilized response of the device includes determining the stabilized response of the device based on the response of the device when the response of the device changes by less than a predetermined amount for a predetermined period of time.

11. The computer-readable storage medium of claim 9, wherein:
determining the stabilized response of the device includes determining the stabilized response based on a relationship between the response of the device and a predetermined response profile.

12. The computer-readable storage medium of claim 9, wherein:
characterizing the response of the device to vibration over the frequency range includes determining a time constant for the response of the device at frequencies in the set of frequencies.

13. The computer-readable storage medium of claim 9, wherein:
characterizing the response includes characterizing the response for a dwell time at frequencies in the set of frequencies.

14. The computer-readable storage medium of claim 9, wherein:
characterizing the response includes characterizing the response based a difference between a predetermined response and the stabilized response.

15. The computer-readable storage medium of claim 9, wherein:
characterizing the response includes characterizing the response based on an elapsed time between when the device begins vibrating at a frequency in the set of frequencies and when the response stabilizes.

16. The computer-readable storage medium of claim 9, wherein:
the device includes a disk drive; and
the response includes at least one of:
 a read rate; and
 a write rate.

17. An apparatus that characterizes a response of a device in a computer system to vibration over a frequency range, the apparatus comprising:
a vibrating mechanism configured to vibrate the device at each frequency in a set of frequencies in the frequency range, wherein the device is vibrated at each frequency, one frequency at a time, until a stabilized response of the device is determined; and
a characterizing mechanism configured to characterize the response of the device to vibration over the frequency range based on information related to the stabilized response at each frequency in the set of frequencies.

18. The apparatus of claim 17, wherein:
the vibrating mechanism includes a mechanism configured to determine the stabilized response of the device based on changes in the response of the device over a predetermined period of time.

19. The apparatus of claim 17, wherein:
the vibrating mechanism includes a mechanism configured to determine the stabilized response of the device based on a relationship between the response of the device and a predetermined response profile.

20. The apparatus of claim 17, wherein:
the characterizing mechanism includes a mechanism configured to characterize the response based on a dwell time at frequencies in the set of frequencies.

21. The apparatus of claim 19, wherein the stabilized response of the device includes at least one of a stabilized read rate for the device or a stabilized write rate for the device.

* * * * *